United States Patent [19]

Worthington et al.

[11] Patent Number: 5,365,050
[45] Date of Patent: Nov. 15, 1994

[54] PORTABLE DATA COLLECTION TERMINAL WITH VOICE PROMPT AND RECORDING

[75] Inventors: Hall V. Worthington; Montgomery W. Worthington, both of Santa Cruz; Steven A. Luzovich, Ben Lomond, all of Calif.

[73] Assignee: Worthington Data Solutions, Santa Cruz, Calif.

[21] Appl. No.: 32,039

[22] Filed: Mar. 16, 1993

[51] Int. Cl.$^5$ .............................................. G06K 7/10
[52] U.S. Cl. ...................................... 235/472; 381/51
[58] Field of Search ................... 235/472, 462; 381/51

[56] References Cited

U.S. PATENT DOCUMENTS

| | | | |
|---|---|---|---|
| 4,509,129 | 4/1985 | Yatsunami et al. | 364/405 |
| 4,782,513 | 11/1988 | Krueger | 364/405 |
| 4,870,687 | 9/1989 | DeLeon | 381/51 |
| 5,056,145 | 10/1991 | Yamamoto et al. | 381/51 |
| 5,208,449 | 5/1993 | Eastman et al. | 235/462 |

FOREIGN PATENT DOCUMENTS 2657991  8/1991  France ................................. 381/51

Primary Examiner—John Shepperd
Attorney, Agent, or Firm—Skjerven, Morrill, MacPherson, Franklin & Friel

[57] ABSTRACT

A portable data collection system includes a portable data collection terminal with a voice prompt circuit having a recording capability, and optionally a bar code scanning device, such as a wand. The portable data collection terminal is similar in size and performs the same data collection functions as prior art portable data collection terminals but adds voice prompts for improved functionality, flexibility, and ease of use. When data is entered from either a keypad, or a bar code scanner, or when the operator needs to be prompted to take a particular action, a voice prompt circuit is activated to provide an oral message to the operator. A feature of the voice prompt circuit is simple recording by the user of oral messages used to generate voice prompts. This allows the user to customize voice prompts for a specific application.

31 Claims, 15 Drawing Sheets

PORTABLE DATA COLLECTION TERMINAL WITH VOICE PROMPT AND RECORDING

BACKGROUND OF THE INVENTION

1. Field of the Invention

The present invention relates in general to enunciators for portable data collection terminals, and in particular to a voice prompt system for a portable data collection terminal.

2. Description of Related Art

A data collection terminal 100 typically has an enclosure 101 housing a display 103, such as a liquid crystal display (LCD) 103, a keypad 102 for entering data, and an enunciator 108 for audible feedback. Optionally, a bar code scanning device, such as a wand 104, may be connected to or integral in data collection terminal 100 for entering bar code data 106. Data collection terminal 100 is typically battery powered using one or more battery cells. To conserve battery power, wand 104 may be pulsed or contain a switch 105 that turns on wand 104 and terminal 100 only while switch 105 is activated.

A typical portable data collection terminal 100 is small and lightweight and is easily held in the hand of the operator during use. Data is collected and stored in terminal 100 as it is entered by the user by either pressing the appropriate keys on keypad 102 or by "scanning" bar code 106 with wand 104.

To "scan" bar code 106 using wand 104, an operator presses switch 105 and then passes wand 104 over bar code 106 in a linear direction substantially perpendicular to the bars. The scanned bar code is decoded by decoder computer 201 (FIG. 2) and stored in nonvolatile read/write memory 202. Enunciator 108 typically beeps after a bar code scan to inform the user that the bar code has been decoded properly.

Decoder computer 201 typically includes a central processing unit (CPU) 214, volatile read/write memory 213, typically static random access memory (SRAM), and nonvolatile read only program memory 215, typically erasable programmable read only memory (EPROM). EPROM 215 contains the firmware that is executed by CPU 214 and that tells CPU 214 what to do. Herein, firmware, program, and software are used interchangeably.

Depending on the process running in terminal 100, (FIG. 2) additional prompts and messages may be displayed on LCD 103 to direct the operator to take various actions such as "Enter Quantity:" or "Enter Item:". In addition, beep tones of various frequencies or a series of beeps may be used to prompt the user to take various actions. However, in many situations, it is cumbersome to read LCD 103, count the beeps, or listen for certain tones while scanning bar codes. Further, data collection is more efficient if it can be done without referring to LCD 103 for the next action to be taken.

In a data collection mode, visual prompts are displayed on LCD 103 to inform the user of the information to be entered. This information may be entered by either scanning one or more bar codes using bar code scanner 104 or keying in the information using keypad 102. As the data is collected, the data is stored in nonvolatile read/write memory 202. When data collection is complete, portable data collection terminal 100 is connected to host computer 210 through input/output (I/O) interface 209. Portable data collection terminal 100 is then put into data upload mode and the collected data is transmitted to host computer 210.

SUMMARY OF THE INVENTION

In accordance with the principles of this invention, a portable data collection system includes a portable data collection terminal with a voice prompt circuit, and optionally a bar code scanning device, such as a wand. The portable data collection terminal of this invention is similar in size and performs the same data collection functions as prior art portable data collection terminals but adds voice prompts for improved functionality, flexibility, and ease of use.

When data is entered from either a keypad or a bar code scanner, which are examples of data input means, or when the operator needs to be prompted to take a particular action, the voice prompt circuit of the portable data collection terminal is activated to provide an oral voice prompt to the user. The oral voice prompt is a significant improvement over the beeps, tones, and visual messages provided by prior art portable data collection terminals.

In one embodiment, the portable data collection terminal of this invention includes a voice prompt circuit a data input means, and a decoder computer. When the portable data collection terminal of this invention is turned on, power is delivered to the decoder computer from a power supply. The decoder computer runs a program that displays messages on a display of the portable data collection terminal and prompts the user using the voice prompt circuit of this invention.

The user selects the mode of operation of the portable data collection terminal by using the data input means, which can include either a keypad or a bar code scanner. The signal generated in response to either pressing a key on the keypad or scanning a bar code using the bar code scanner is processed by the decoder computer.

For example, when the bar code scanner is scanned across a bar code, the output voltage from the bar code scanner is sent to the decoder computer. The decoder computer decodes the scanned bar code and stores the information in a nonvolatile read/write memory in a manner well-known to those skilled in the art.

After the scanned bar code is decoded, for example a bar code representing "4983", the decoder computer automatically activates the voice prompt circuit and addresses the oral messages stored in the voice prompt circuit and sends the necessary commands to the voice prompt circuit to retrieve and play the oral messages. Thus, the voice prompt circuit responds with the oral voice prompt "four, nine, eight, three," or in another mode "Enter quantity" or "Enter stock number". If the portable data collection terminal is configured as a bar code verifier, the terminal responds with oral qualitative statements describing the characteristics of the scanned bar code. A feature of the voice prompt circuit is simple recording by the user of oral messages used to generate voice prompts. This allows the user to customize voice prompts for a specific application.

As data is collected, the user is prompted by the information on the display, an oral voice prompt from the voice prompt circuit of this invention, or both. By entering data using the bar code scanner and using voice prompts from the voice prompt circuit for feedback, the user need not refer to the display to determine the next course of action and is therefore more productive. Thus, voice prompts provide the ability to combine visual messages and oral voice prompts. Further, the oral voice prompts generated by the voice prompt circuit provide the convenience and speed of not having to look at the display when using the portable data collection terminal of this invention.

DETAILED DESCRIPTION

In accordance with the principles of this invention, a portable data collection system includes a portable data collection terminal 300 with a voice prompt circuit, and optionally a bar code scanning device, such as wand 304. Portable data collection terminal 300 is similar in size and performs the same data collection functions as prior art portable data collection terminals but adds voice prompts for improved functionality, flexibility, and ease of use.

When data is entered from either a keypad 302, or a bar code scanner 304, or when the operator needs to be prompted to take a particular action, a voice prompt circuit is activated to provide an oral voice prompt to the user. The oral voice prompt provided by portable data collection terminal 300 is a significant improvement over the beeps, tones, and visual messages provided by prior art portable data collection terminals.

Figure 1:
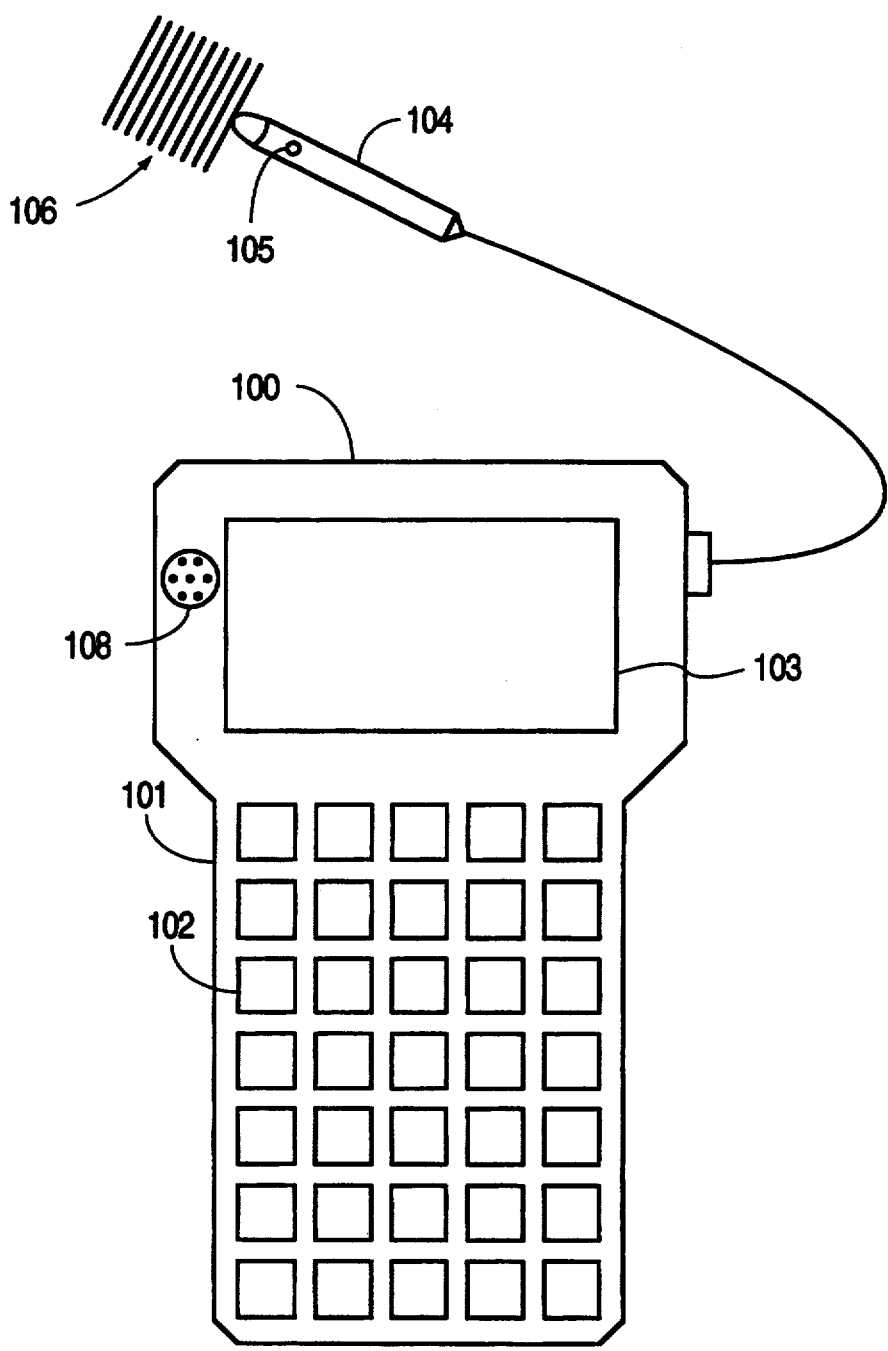
FIG. 1 illustrates a typical prior art portable data collection terminal with a bar code scanner attached.
Figure 2:
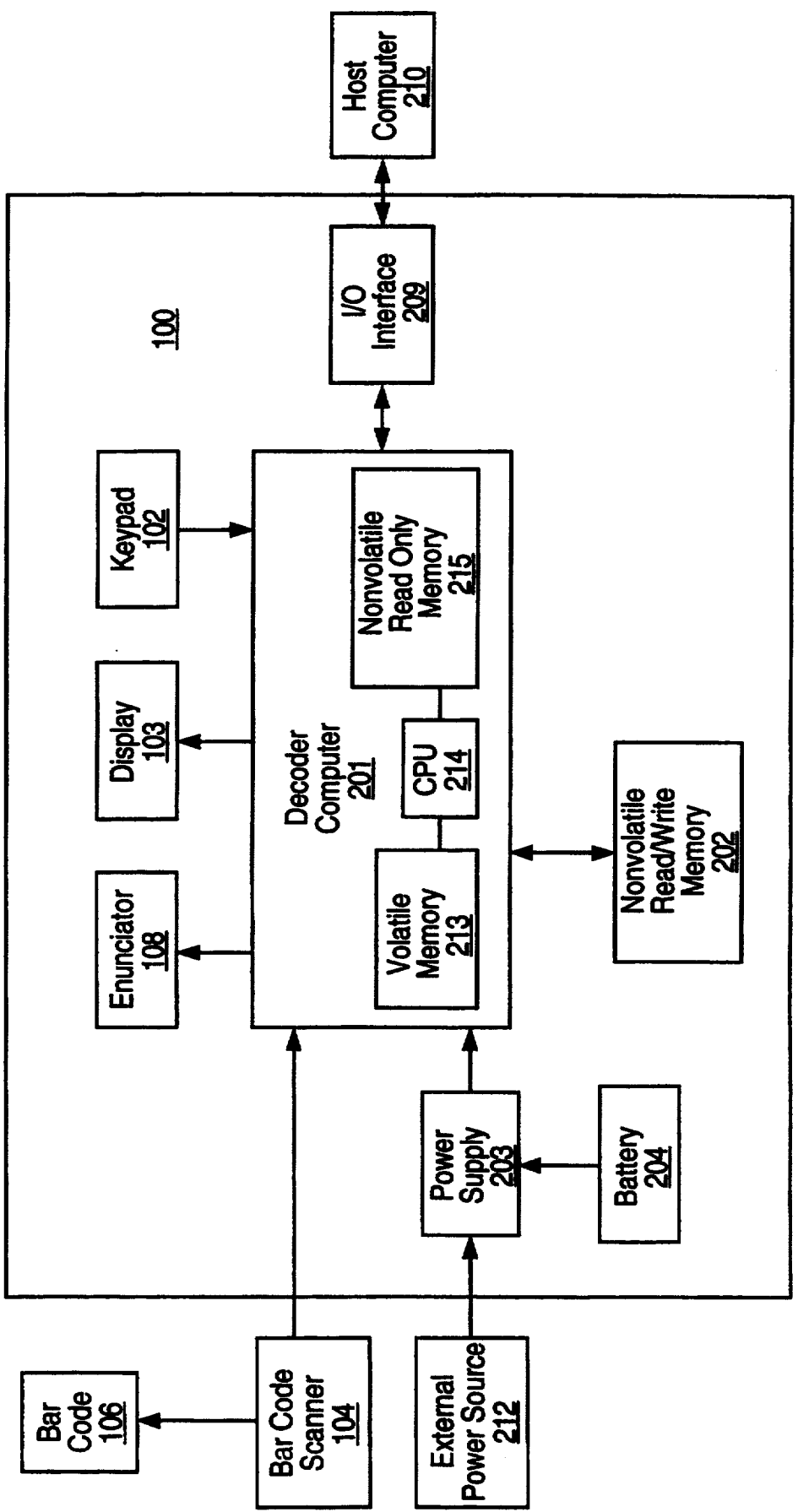
FIG. 2 is a block diagram of a typical prior art portable data collection terminal.
Figure 3:
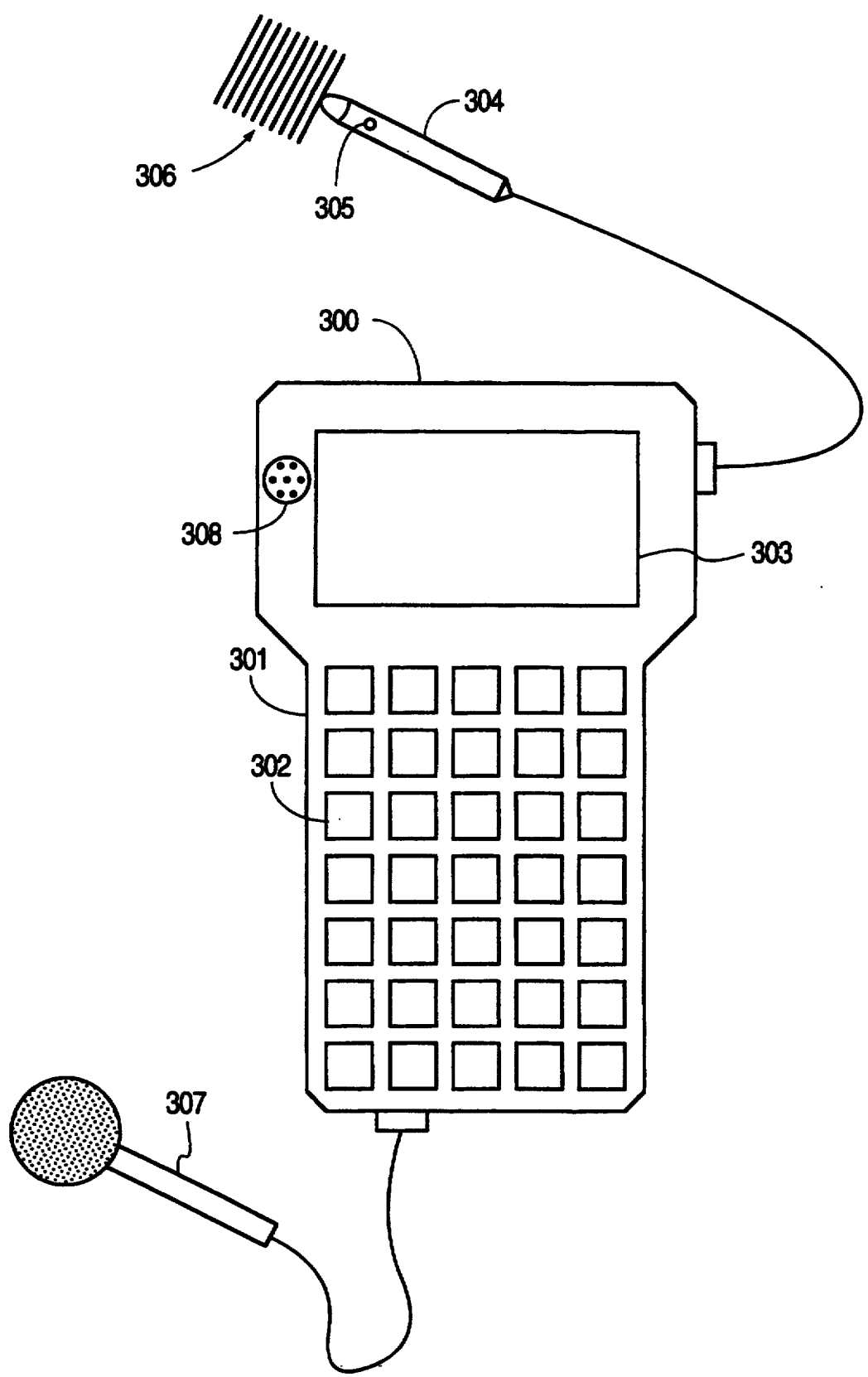
FIG. 3 illustrates a portable data collection terminal of this invention with a bar code scanner attached and voice prompt capability.
Figure 4A:
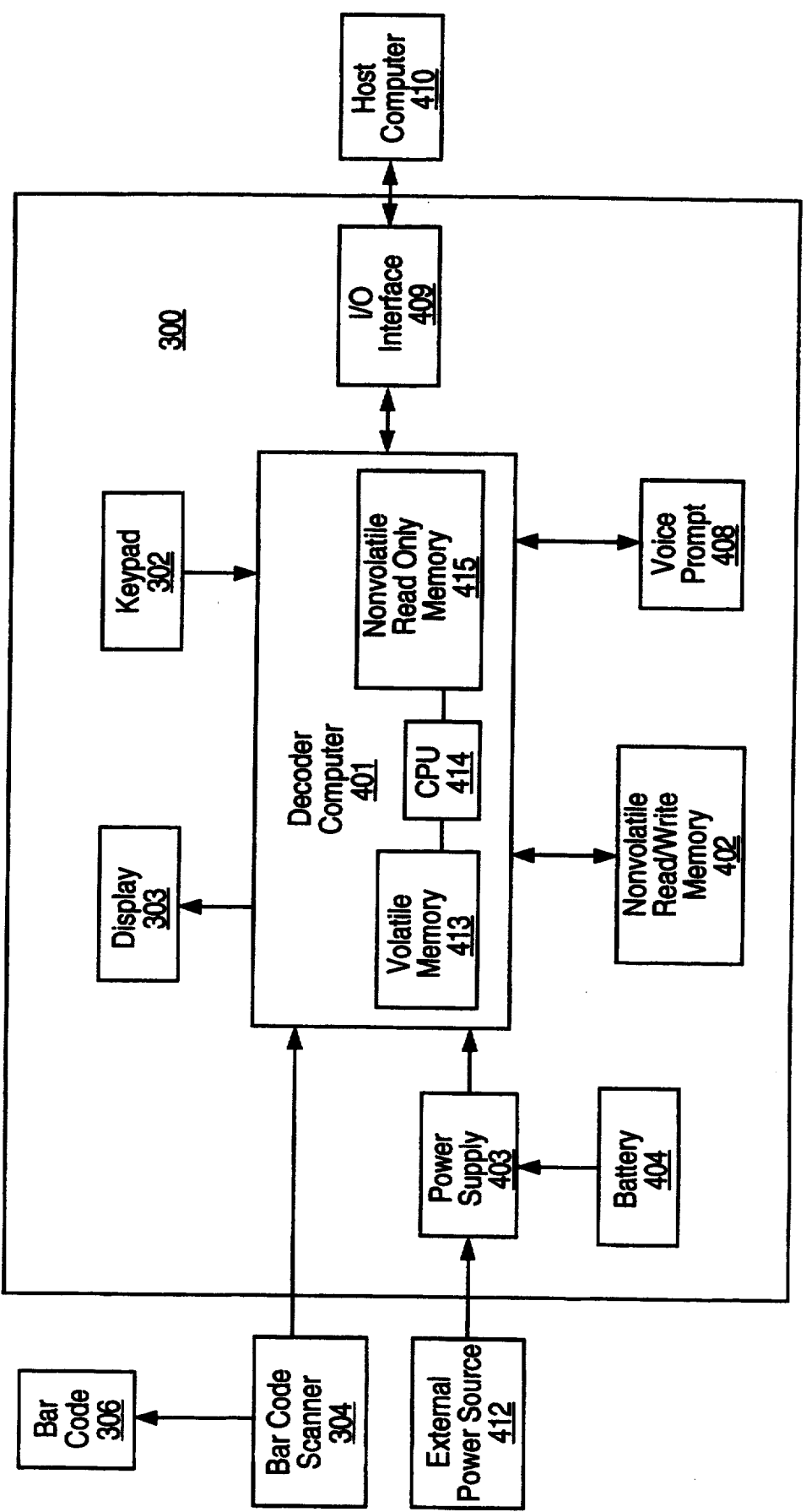
FIG. 4A is a block diagram of the portable data collection terminal of this invention with an external bar code scanner.
Figure 4B:
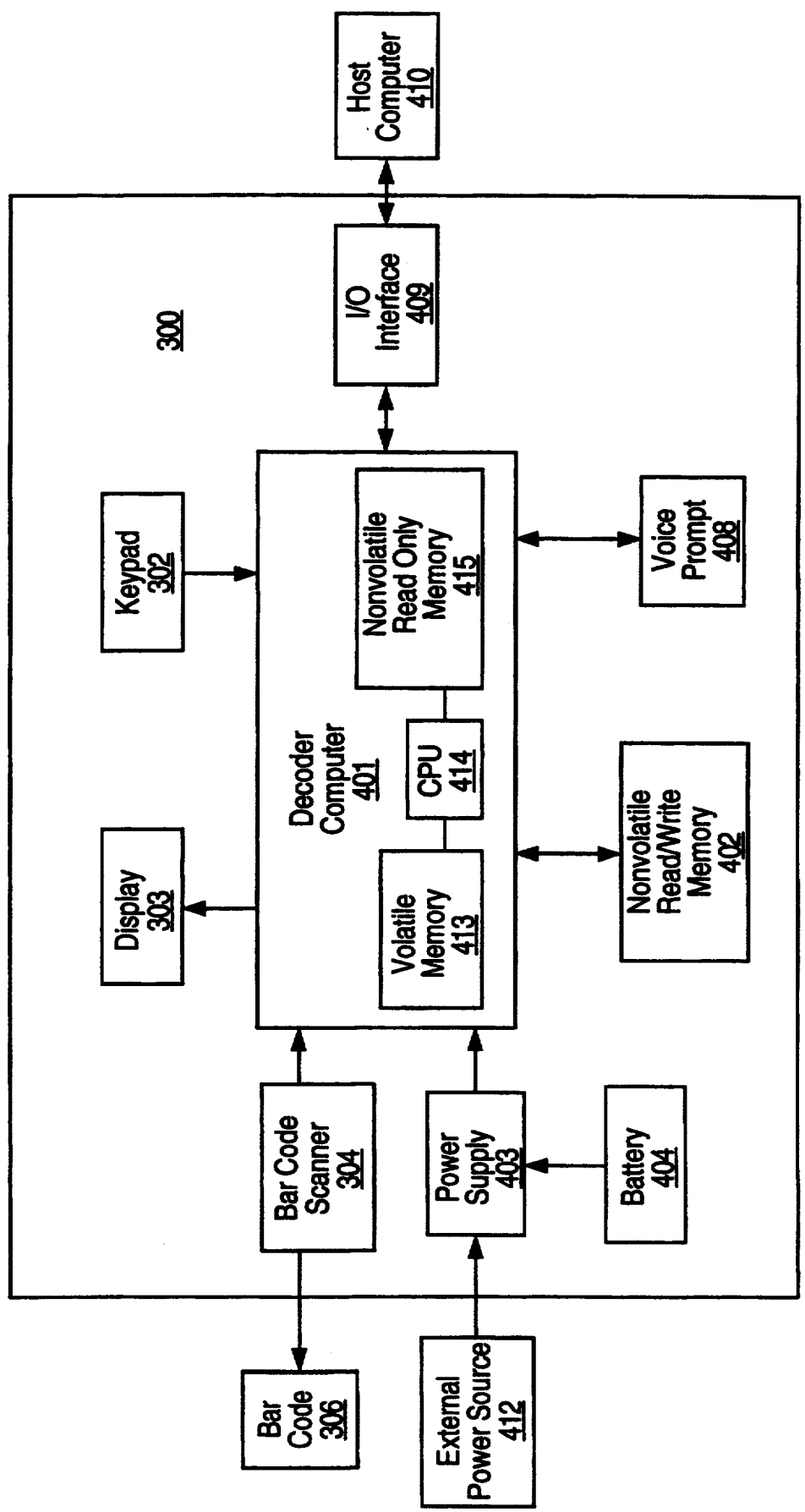
FIG. 4B is a block diagram of the portable data collection terminal of this invention with an internal bar code scanner.
Figure 4C:
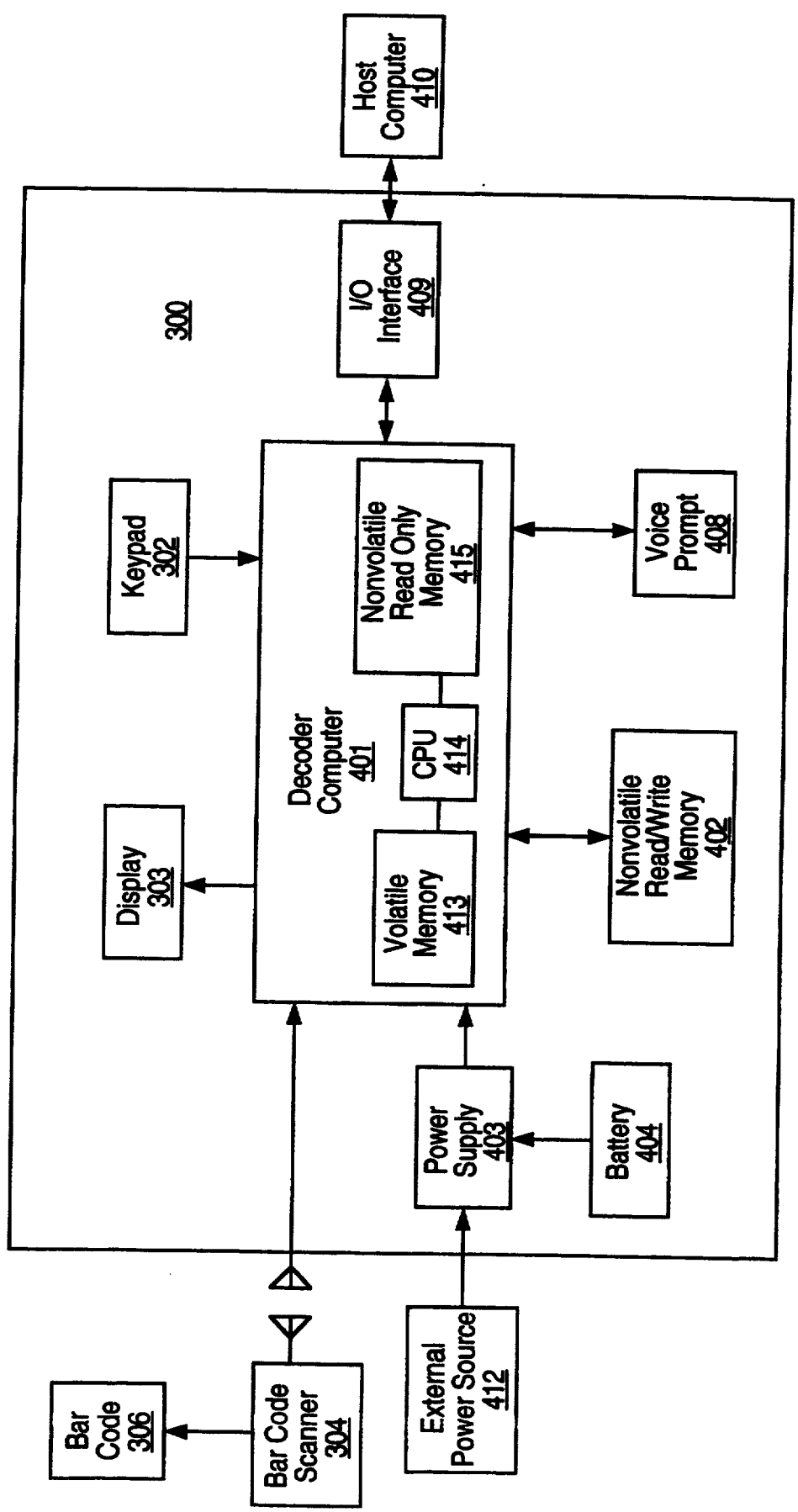
FIG. 4C is a block diagram of the portable data collection terminal of this invention with a wireless bar code scanner.

While in FIG. 3, bar code scanner 304 is connected by a cable to portable data collection terminal 300, this is only illustrative of a bar code scanner and is not intended to limit the invention to a cabled wand. One skilled in the art will appreciate that other types of bar code scanners and data collection devices such as CCD scanners, laser scanners, and magnetic strip readers may serve as data input means to portable data collection terminal 300. Bar code scanner 304 can also be built as an integral part of portable data collection terminal 300. (FIG. 4B) Alternatively, bar code scanner 304 can be a cordless wand that transmits data to portable data collection terminal 300. (FIG. 4C) For example, the cordless wand, described in copending and commonly assigned U.S. patent application Ser. No. 07/958,638, entitled "LOW POWER CORDLESS BAR CODE SCANNER" of H. Worthington et al. which is incorporated herein by reference in its entirety, could be utilized with portable data collection terminal 300.

Components 104, 103, 102 and bar code 106 of portable data collection terminal 100 are, in this embodiment, the same as components 304, 303, 302 and bar code 306, respectively of portable data collection terminal 300.

In one embodiment, portable data collection terminal 300 of this invention includes a voice prompt circuit 408 (FIG. 4A), keypad 302, display 303, power supply 403, optionally bar code scanning device 304, nonvolatile read/write memory 402 for data storage, and a decoder computer 401 that includes central processing unit 414, volatile read/write memory 413, and nonvolatile read only program memory 415. When portable data collection terminal 300 of this invention is turned on, power is delivered to decoder computer 401 from power supply 403. Power supply 403 is driven by either an internal battery 404 or by an external power source 412. Again components 401, 402, 403, 404, 409, 413, 414, 415 of portable data collection terminal 300 are, in this embodiment, the same as components 201, 202, 203, 204, 209, 213, 214 and 215 respectively of portable data collection terminal 100.

Decoder computer 401 runs a program that displays messages on display 303 and can prompt the user using voice prompt circuit 408 as well. The user selects the mode of operation by either pressing a key on keypad 302 or by scanning bar code 306 using bar code scanner 304. The signal generated in response to either pressing a key on keypad 302 or scanning bar code 306 is processed by decoder computer 401, as described more completely below.

In a data collection mode of terminal 300, when bar code scanner 304 is scanned across bar code 306, the output voltage from bar code scanner 304 is representative of bar code 306. This output voltage is sent to decoder computer 401 which decodes bar code 306 and stores the information in nonvolatile read/write memory 402 in a manner well-known to those skilled in the art.

In this embodiment, decoder computer 401 uses programs stored in EPROM 415 to decode the voltage generated by scanning bar code 306. The programs stored in EPROM 415 are similar to prior art programs except the programs include the capability to send addresses and control signals, sometimes referred to as "commands" to voice prompt circuit 408 to generate the desired oral voice prompt. The modification required to the prior art programs to include voice prompt capability will be apparent to those skilled in the art in view of the following disclosure.

Voice prompt circuit 408 can be activated at any time. Voice prompt circuit 408 is typically automatically activated in response to data input such as a user pressing a key on keypad 302 or scanning bar code 306. For example, a user may press key "1" on keypad 302 and in response, the number "one" is spoken back by voice prompt circuit 408 in the user's language to confirm that key "1" was pressed. Alternatively, after a multi-digit number such as "2398" is entered by the user and the "Enter" key is pressed, voice prompt circuit 408 responds with the oral voice prompt of either "two thousand nine hundred and eight" or "two, three, nine, eight" depending on the programming of portable data collection terminal 300.

After scanning a bar code of the number "4983," voice prompt circuit 408 responds with the oral voice prompt "four, nine, eight, three," or in another mode "code thirty-nine, four, nine, eight, three" to identify the type of code and the data stored in the bar code. If portable data collection terminal 300 is configured as a bar code verifier, terminal 300 responds with qualitative oral statements describing the characteristics of the scanned bar code.

To assist the user with data collection, voice prompt circuit 408 can respond to scanned or entered data with voice prompts such as "Enter item number", "Scan user ID", or "Bad Item Number, Re-enter". Any message that can be spoken can be stored in voice prompt circuit 408. The only limitation is the length of time of the message.

As data is collected, the user is prompted by the information on display 303, the oral voice prompt from voice prompt circuit 408, or both. By entering data using bar code scanner 304 and using voice prompts from voice prompt circuit 408 for feedback, the user need not refer to display 303 to determine the next course of action and is therefore more productive. Thus, voice prompts provide the ability to combine visual messages and oral voice prompts. Further, the oral voice prompt generated by voice prompt circuit 408 provides the convenience and speed of not having to look at the display when using portable data collection terminal 300. Voice prompts may also be used to alert the user in the case of an error or incorrectly entered data.

Voice prompt circuit 408 can record and playback any message spoken to it. To facilitate play back of the messages in any desired sequence, each recorded message is assigned an index which is subsequently used to access the recorded message, as explained more completely below. Voice prompt circuit 408, in one embodiment, can record up to 40 seconds of indexed messages that can be combined in any order during playback.

Figure 5:
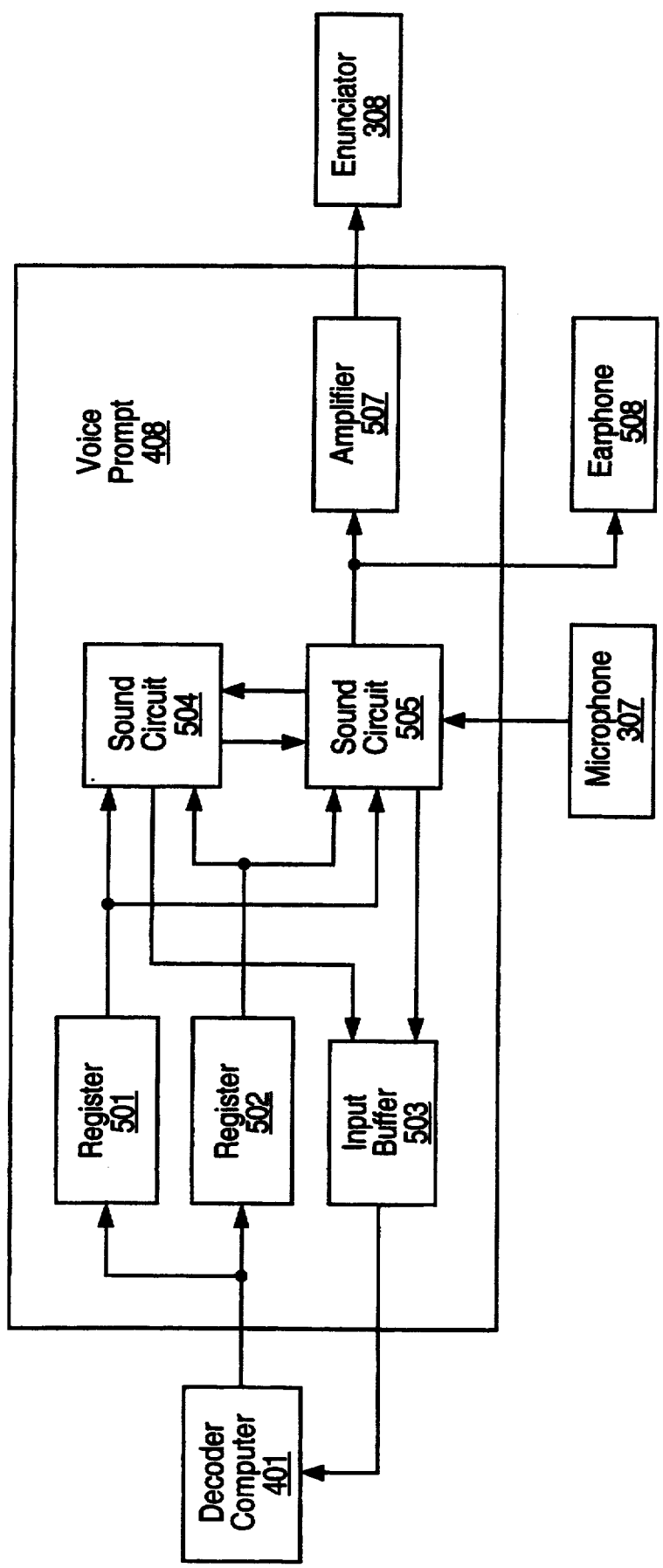
FIG. 5 is a block diagram of the voice prompt circuit in one embodiment of the portable data collection terminal of this invention.

FIG. 5 is a more detailed block diagram of one embodiment of voice prompt circuit 408. In this embodiment, two direct analog storage integrated circuits are used to store the up to 40 seconds of recorded messages. One integrated circuit is configured as master sound circuit 505 and the other as slave sound circuit 504. Each sound circuit can store 20 seconds of recorded messages. Only one sound circuit can playback or record messages at a time. After master sound circuit 505 has been filled with 20 seconds of messages slave sound circuit 504 is used to store the next 20 seconds of messages. An input buffer 503 is provided to allow decoder computer 401 to monitor the status of sound circuits 504 and 505 to determine when a voice prompt has terminated playing.

An electret condenser microphone 307 is attached to the microphone input terminal of master sound circuit 505 to allow recording of custom messages by the user. A microphone input circuit, which is described more completely below, includes a bias network that converts audio frequency waves from microphone 307 into electrical signals which are further low pass filtered and preamplified by master sound circuit 505. An AGC (Automatic Gain Control) circuit in master sound circuit 505 is utilized to control the gain of the preamplifier. The AGC circuit reduces amplification on loud sounds to eliminate clipping and increases amplification on soft sounds to make them louder.

The signal from the preamplifier is amplified and sampled by master sound circuit 505 and then stored in one of sound circuits 504 or 505. Specifically, a nonvolatile CMOS analog storage array using EEPROM technology is provided in sound circuits 504 and 505 to reduce power consumption and lower cost. The incoming signal is sampled at 125 $\mu$sec intervals and sequentially stored in the nonvolatile CMOS analog storage array. Since this array is an EEPROM structure, no external power is required to retain the signals once they are stored in the array. While in this embodiment the nonvolatile storage means is a CMOS EEPROM structure, those skilled in the art will appreciate that a variety of volatile and nonvolatile storage means can be utilized. The storage means selected depends on the sound circuits used, power constraints and cost, for example.

Decoder computer 401 has control over the various modes of operation of sound circuits 504 and 505. The operational modes for voice prompt circuit 408 are record and playback. To save battery power, a power down mode of voice prompt circuit 408 is selected by decoder computer 401 when no recording or playback functions are desired.

Master sound circuit 505 includes an output filter that reduces sampling frequency noise and smooths the output waveform. The output signal from master sound circuit 505 is amplified by amplifier circuit 507 to about 250 mW RMS. The amplified signal from amplifier circuit 507 directly drives an enunciator 308 with an impedance of 8 ohms or greater. An earphone 508 may also be used instead of, or in addition to, enunciator 308 for monitoring the audio output. For example, earphone 508 is directly connected to the speaker output pin of master sound circuit 505.

As described more completely below, voice prompts are generated by voice prompt circuit 408 in response to decoder computer 401 writing two bytes of information into output registers 501 and 502. First, the address of the voice prompt is loaded and then the play command. Registers 501 and 502 store the addressing information used to select one oral message from the plurality of oral messages stored in sound circuits 504 and 505. Registers 501 and 502 also store operational mode commands for sound circuits 504 and 505, such as play/record (P/R), power down (PD), and chip enable (CE).

Messages are recorded in portable data collection terminal 300 by adding microphone 307. No additional hardware or software is required to record the messages. In one method of recording a message, the user selects a number for the message by pressing the appropriate keys on keypad 302, and then presses a predetermined key on keypad 302 to begin recording. CPU 414 issues a beep from enunciator 308 when CPU 414 is ready to record. The user speaks into microphone 307 and the message is recorded by sound circuits 504 and 505. When the length of time allotted for the message has passed, CPU 414 issues another beep from enunciator 308 and the recording process stops.

CPU 414 uses the number entered by the user to index the message. The message stored in sound circuits 504 or 505 can be played back in any order to generate a voice prompt. For example, if message #045 was "Enter", message #029 was "Data" and message #073 was "Quantity" the voice prompt "Enter Data" is created by playing message #045 followed by a short delay then message #029. Similarly, the voice prompt "Enter Quantity" is generated by playing message #045 followed by a short delay then message #073. Thus, many voice prompts may be created from a selected group of messages. The voice prompts are created by providing an appropriate program in EPROM 415 for execution by CPU 414. Custom voice prompts may be recorded by the user or created from recorded messages.

Herein, a "message" is one indexed oral entry that is stored in sound circuits 504 and 505. A "voice prompt" is the playback of a "message" or a group of "messages" by CPU 414 in response to instructions stored in EPROM 415. Thus, a customized voice prompt can be a single message. However, more flexibility is generally provided by storing a plurality of messages in sound circuits 504 and 505 and using various combinations of the stored messages to create a plurality of voice prompts.

Figure 6:
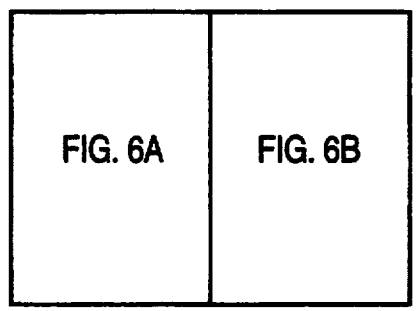
FIG. 6 is a wiring diagram of the voice prompt circuit of FIG. 5.
Figure 6A:
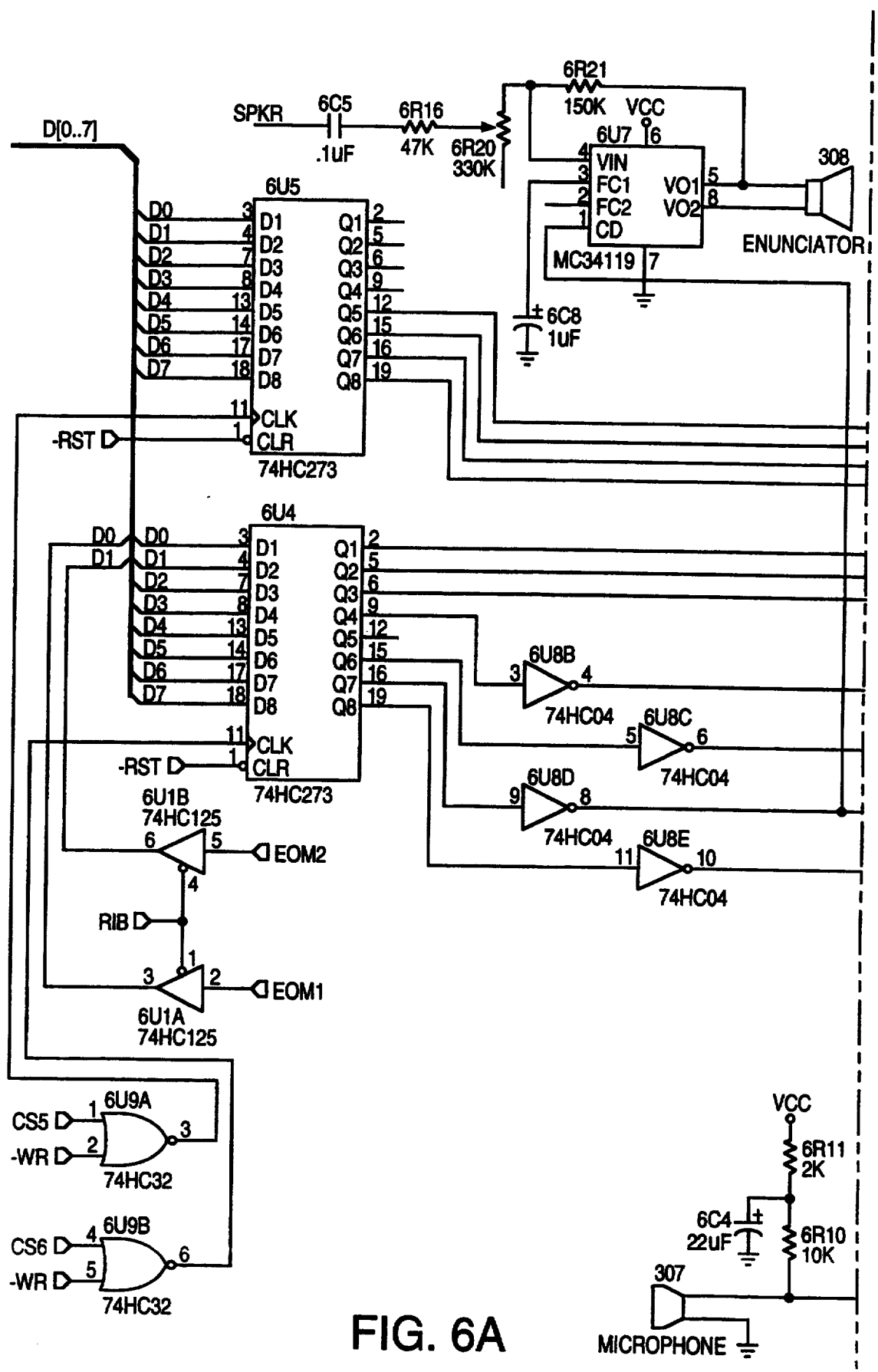
Figure 6B:
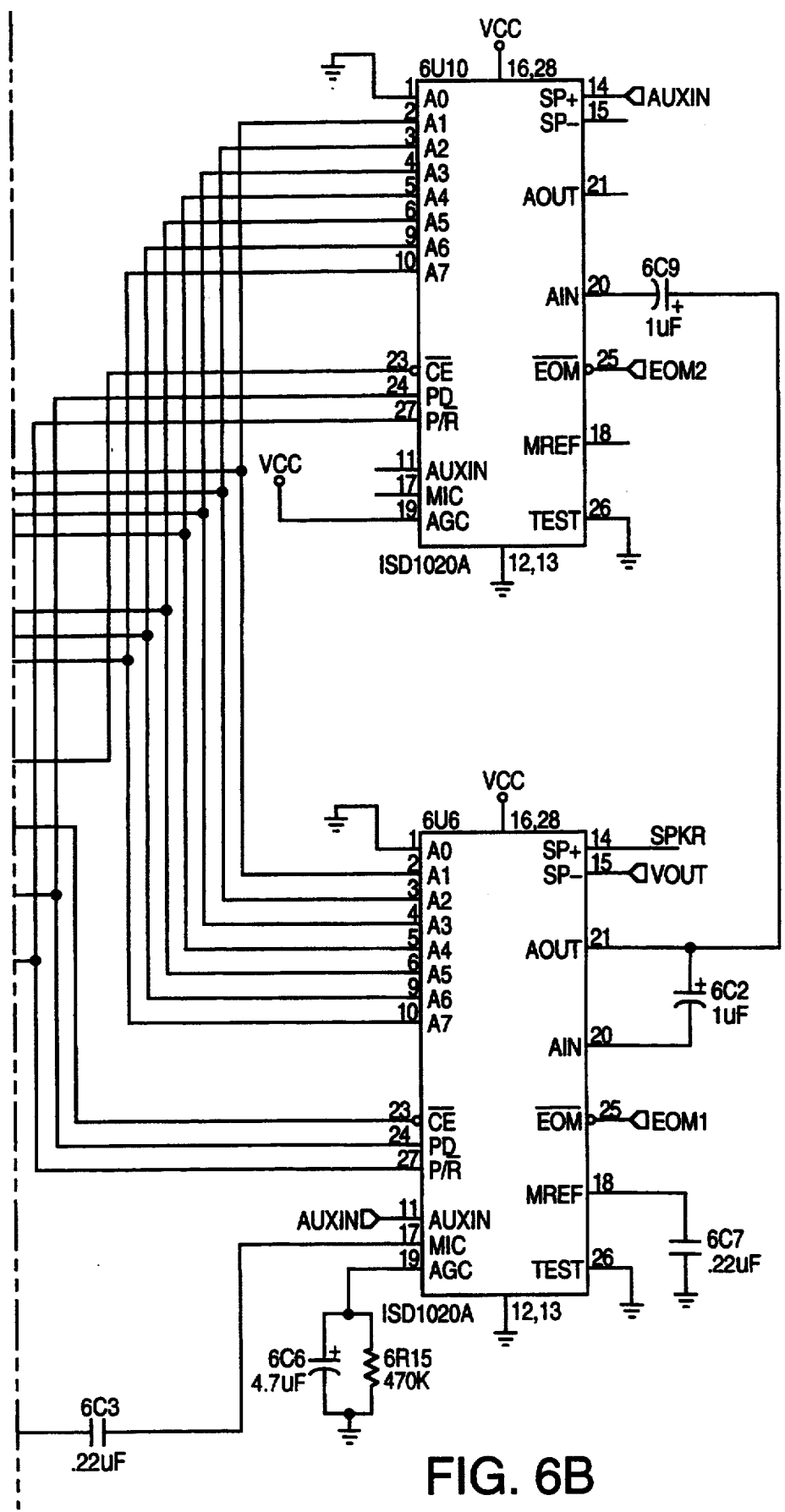

One embodiment of the voice prompt circuit 408 of portable data collection terminal 300 is illustrated in more detail in FIG. 6. Registers 501 and 502 are eight-bit registers 6U4 and 6U5. One eight-bit register integrated circuit suitable for use in this inventions is sold by Texas Instruments as Part No. 74HC273. Eight-bit registers 6U4 and 6U5 have I/O addresses 0005H and 0006H respectively in the I/O address space of decoder computer 401.

A command or a message address, collectively referred to as data, is loaded into eight-bit register 6U5 when CPU 414 writes to I/O address 0005H and a command or a message address is loaded into eight-bit register 6U4 when CPU 414 writes to I/O address 0006H. Specifically, the I/O address 0005H from CPU 414 is decoded as a low signal on line CS5 during an I/O cycle and I/O address 0006H from CPU 414 is decoded as a low signal on line CS6 during an I/O cycle. One skilled in the art will appreciate that the logic levels and logic gates described herein are only illustrative and the invention can be implemented using both other logic gates and other logic levels.

Line CS5 is connected to a first input terminal of logic OR gate 6U9A. The other input terminal of logic OR gate 6U9A is driven by CPU 414 signal −WR. The output terminal of logic OR gate 6U9A is connected to terminal CLK of eight-bit register 6U5.

Line CS6 is connected to a first input terminal of logic OR gate 6U9B. The other input terminal of logic OR gate 6U9B is driven by CPU 414 signal −WR. The output terminal of logic OR gate 6U9B is connected to terminal CLK of eight-bit register 6U4.

During the write, the I/O address of the register to be written to is output onto the address bus (not shown) which is decoded to drive the signal on one of lines CS5 or CS6 low. The signal on line −WR is driven low and data is output onto data bus lines D0–D7 from CPU 414. The data is loaded into either 8-bit register 6U4 or 8-bit register 6U5 by the rising edge of the signal on write line −WR which is driven by CPU 414. Bits 4 through 7 of 8-bit register 6U5 drive address input terminals A1 through A4 of both sound integrated circuits 6U6 and 6U10. Bits 0 through 2 of 8-bit register 6U4 drive address input terminals A5 through A7 of both sound integrated circuits 6U6 and 6U10.

Bit 3 of 8-bit register 6U4 drives inverter 6U8B which in turn drives chip enable input terminal $\overline{CE}$ of sound integrated circuit 6U10. Bit 5 of 8-bit register 6U4 drives inverter 6U8C which in turn drives chip enable input terminal $\overline{CE}$ of sound integrated circuit 6U6 through inverter 6U8C. Command CE for sound integrated circuit 6U10 is issued when a logic one value is loaded into bit 3 of eight-bit register 6U4. CPU 414 issues command CE for sound integrated circuit 6U6 by loading a logic one value into bit 5 of 8-bit register 6U4.

Bit 6 of 8-bit register 6U4 drives inverter 6U8D which in turn drives power down input terminals PD of sound integrated circuits 6U6 and 6U10 and input terminal CD of audio amplifier 6U7. CPU 414 issues command PD to sound integrated circuits 6U6 and 6U10 and audio amplifier 6U7 by loading a logic zero value into bit 6 of 8-bit register 6U4.

Bit 7 of 8-bit register 6U4 drives inverter 6U8E, which in turn drives play/record input terminal $P/\overline{R}$ of sound integrated circuits 6U6 and 6U10. CPU 414 issues the play command to sound integrated circuits 6U6 and 6U10 by loading a logic zero value into bit 7 of 8-bit register 6U4. The record command is issued to sound integrated circuits 6U6 and 6U10 when CPU 214 loads a logic one value into bit 7 of 8-bit register 6U4.

Input buffers 6U1A and 6U1B allow CPU 414 to monitor the playback status of sound integrated circuits 6U6 and 6U10. Input buffer 6U1A is driven by sound integrated circuit 6U6 signal EOM1. Input buffer 6U1B is driven by sound integrated circuit 6U10 signal EOM2. The input buffer enable lines of input buffers 6U1A and 6U1B are connected together and driven by the read input buffer (RIB) signal from CPU 414. In response to CPU 414 driving signal RIB low, input buffers 6U1A and 6U1B drive data lines D0 and D1.

Address input line A0 of both sound integrated circuits 6U6 and 6U10 is connected to ground. Each sound integrated circuit, in this embodiment, supports a maximum of 160 messages of 125 milliseconds each. Connecting address input line A0 to ground halves the number of messages supported to 80, but the length of each message is doubled to 250 milliseconds. Preferably, sound integrated circuits 6U6 and 6U10 have the characteristics given in Table 1.

TABLE 1

| | Characteristics of Sound Integrated Circuits 6U6 and 6U10 |
|---|---|
| 1) | Single-integrated circuit voice record and playback |
| 2) | Direct Analog Storage Technology |
| 3) | Built-in microphone preamplifier, automatic gain control, and filtering |
| 4) | Nonvolatile EEPROM technology |
| 5) | 5 VDC operation |
| 6) | 25 mA maximum current draw during operation |
| 7) | 10 μA maximum current draw during power down |

An important aspect in selecting a sound integrated circuit is that sound integrated circuits 6U6 and 6U10 require only a few external components so that size, weight, and power consumption of portable data collection terminal 300 is minimized. One sound integrated circuit suitable for use in portable data collection terminal 300 of this invention is sold by Information Storage Devices of San Jose, Calif. under Model No. ISD10-20A.

Figure 7:
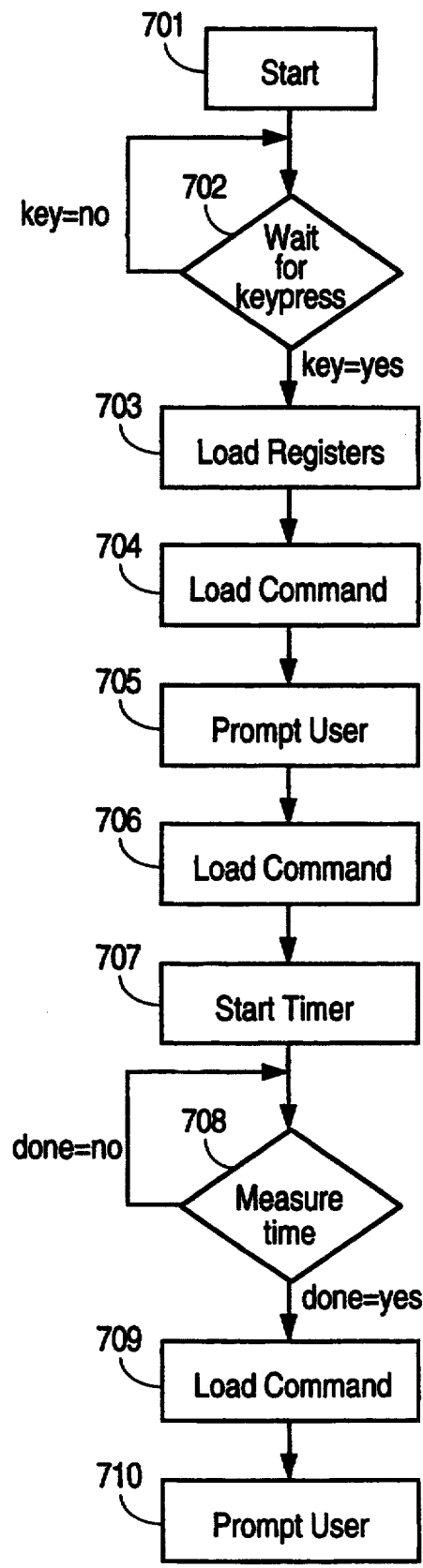
FIG. 7 is a flow chart illustrating the steps in a program that is executed by the CPU in the portable data collection terminal to record a voice prompt.

FIG. 7 illustrates the flow of commands issued by decoder computer 401 to voice prompt circuit 408 to record a voice prompt into sound integrated circuits 6U6 and 6U10. To start the recording process at start step 701, the user enters a number to identify the voice prompt to be recorded. Step 702, wait for key press, is then initiated. CPU 414 scans for signals from keypad 302 and waits for the user to press a predetermined key to begin recording.

Figure 8:
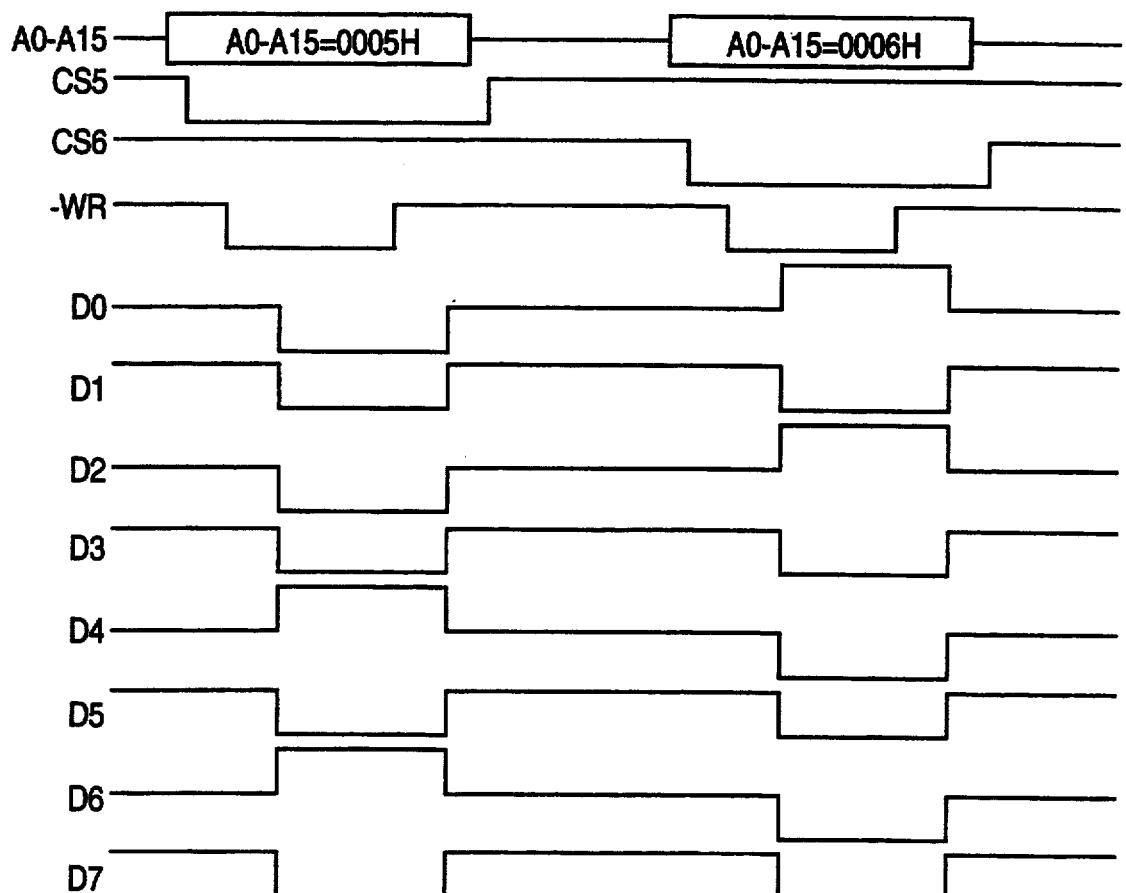
FIG. 8 is a timing diagram illustrating events (control signals) vs. time for a control sequence in the flowcharts in FIGS. 7 and 12.

When CPU 414 detects that the predetermined key for recording an oral message has been pressed, load registers step 703 is initiated. CPU 414 loads the starting address of the message to be recorded into 8-bit registers 6U4 and 6U5. The starting address is referenced to the number entered by the user for the message. A timing diagram 800 of loading 8-bit registers 6U4 and 6U5 with address AAH for sound integrated circuits 6U6 and 6U10 is presented in FIG. 8. The address on the CPU address bus is represented by reference label A0–A15 and is simply shown as either 0005H or 0006H. The remaining signals are the signals on lines CS5, CS6, −WR and bus D0 to D7 (FIG. 6) respectively. FIG. 8 shows that first the signal on line CS5 is driven low so that CPU 414 can write to register 6U5.

After the signal on line CS5 is taken low, the signal on line −WR is driven low. When the signal on line −WR is low, the signals on lines D0 to D3, D5 and D7 are taken low and the signals on lines D4 and D6 are driven high. When the signals on lines D0 to D7 are stable, the signal on line −WR is driven high and the rising edge loads the values on lines D0 to D7 into register 6U5.

After register 6U5 is loaded, the signals are dropped on line D0 to D7 and the signal on line CS5 is taken high. This completes the loading of register 6U5. Register 6U4 is loaded in a similar fashion when the address 0006H is driven on address bus A0–A15. Note that in loading register 6U4 with an address, bit D1 is driven low and bits D0 and D2 are driven high. Note that in these examples unused data lines are driven low but either state provides the same result.

After the registers are loaded with the starting address, in a first load command step 704, CPU 414 loads the record command and the power-up command into 8-bit register 6U4. CPU 414 beeps enunciator 308 in a first prompt user step 705 to alert the user that the recording process is beginning. This is immediately followed by CPU 414 loading the chip enable command into 8-bit register 6U4 in a second load command step 706.

Figure 9:
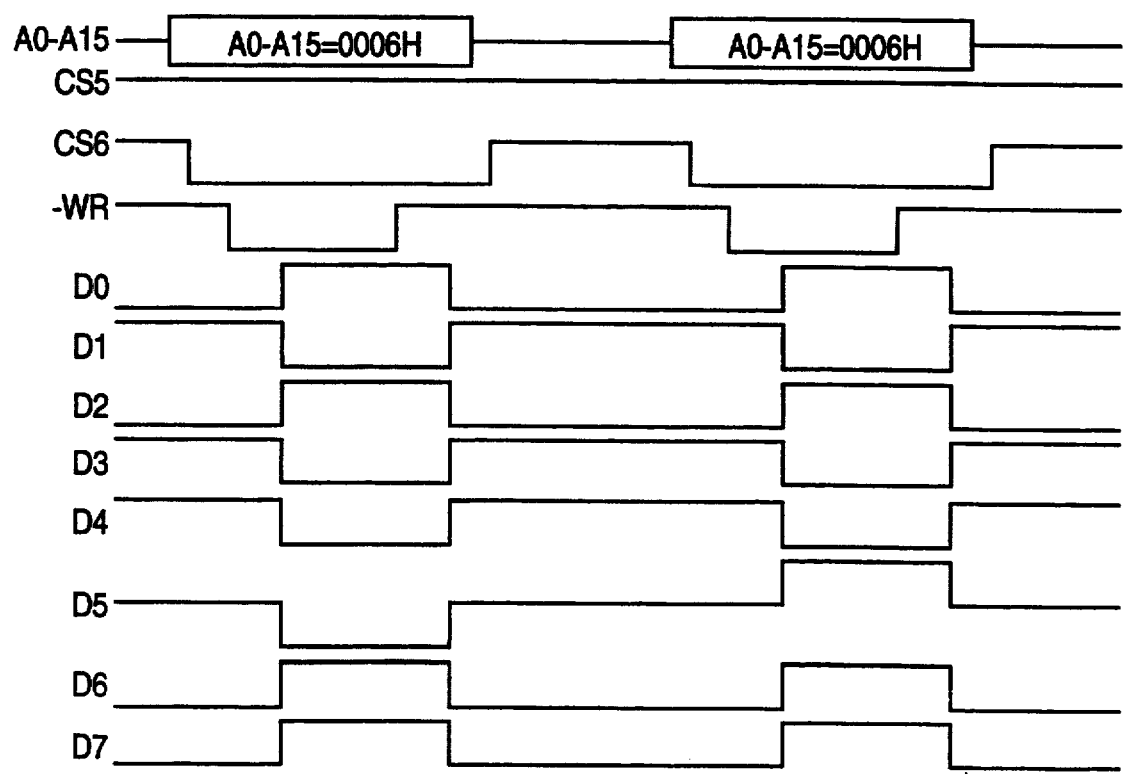
FIG. 9 is a timing diagram illustrating events vs. time for a control sequence in the flowchart in FIG. 7.

FIG. 9 is a timing diagram for loading 8-bit register 6U4 with the power-up command followed by the chip enable command in record mode for sound integrated circuit 6U6. Since bits 5 to 7 of register 6U4 control the chip enable, power-up, and play/record respectively commands, CPU 414 writes to I/O address 0006H. The timing sequence for signals on lines CS6, −WR and data bus D0 to D7 is the same as that described for FIG. 8. First, the signal on line CS6 is driven low. Next CPU 414 drives the signal on line −WR low. After the signal on line −WR is low, CPU 414 drives the signals on lines D0, D2, D6 and D7 high and the signals on lines D1, D3, D4 and D5 low. The signals on lines D0 to D7 are held in their respective states until CPU 414 drives the signal on line −WR high which in turn loads the record and power-up signals on lines D0 to D7 into register 6U4.

In start timer step 707, CPU 414 begins measuring the time of the recording. The words spoken by the user into microphone 307 are recorded by sound integrated circuit 6U6 or 6U10. Preferably, microphone 307 has the characteristics given in Table 2.

TABLE 2

| Characteristics of Microphone 307 |
| --- |
| Electret type |
| 1K ohm impedance |
| Frequency response of 50–8K Hz |
| Sensitivity of 64 dB |
| Signal-to-noise ratio of greater than 40 dB |
| Less than 1 mA current drain |
| Operates on 2 to 10 VDC |

One microphone 307 suitable for use in portable data collection terminal 300 is sold by Radio Shack of Fort Worth, Tex. under model number 33-1060.

Resistors 6R10 and 6R11 and capacitor 6C4 (FIG. 6) form a bias circuit that provides filtered power to microphone 307. DC blocking capacitor 6C3 is connected between microphone 307 and the preamplifier input stage of sound integrated circuit 6U6. Capacitor 6C3 removes the DC component from the low level audio frequency AC signal from microphone 307.

Inside sound integrated circuit 6U6, amplification is performed in two stages. The audio frequency input signal from microphone 307 on pin MIC of sound integrated circuit 6U6 is preamplified by an input preamplifier. The preamplifier output signal is amplified by a fixed gain amplifier. The fixed gain amplifier drives analog output pin AOUT. The signal path between the analog output and analog input of sound integrated circuit 6U6 is completed by connecting a capacitor 6C2 between the analog output pin AOUT and the analog in pin AIN of sound integrated circuit 6U6. Capacitor 6C2 provides an additional pole for low-frequency cut-off. The signal on analog output pin AOUT of sound integrated circuit 6U6 can also be fed to the slave sound integrated circuit 6U10 by connecting a capacitor 6C9 between pin AOUT of the master sound integrated circuit 6U6 and the pin AIN of the slave sound integrated circuit 6U10. By making these connections either integrated circuit may record the voice input from microphone 307.

An automatic gain control (AGC) circuit inside sound integrated circuit 6U6 dynamically monitors the output signal level of the fixed gain amplifier and sends a gain control voltage to the preamplifier. The preamplifier gain is automatically adjusted to maintain an optimum signal level into the input filter. This gives the highest level of recorded signal while reducing clipping to a minimum.

The characteristics of the AGC circuit are set by two time constants; the attack time and the release time. Attack time is the time required by the AGC circuit to reduce gain in response to an increasing input signal. Release time is the time constant of the gain increase in the presence of a decreasing signal. Resistor 6R15 and capacitor 6C6 set the attack and release time to optimum values for human speech. Noise-canceling common mode rejection is provided in sound integrated circuit 6U6 to reduce background noise from microphone 307 by connecting capacitor 6C7 between pin MREF and ground. Capacitor 6C7 preferably has the same capacitance as capacitor 6C3.

Following the fixed gain amplifier stage is an input filter. Although the storage is analog in nature, sampling techniques are employed and consequently require an anti-aliasing filter to remove or reduce input frequency components above half the sampling frequency. With a sampling frequency of 8 kHz, a high frequency cutoff for the low-pass filter of 3.4 kHz will satisfy the Nyquist Criterion and allow for a frequency band width sufficient for good quality voice reproduction. The input filter is a continuous time, 5 pole lowpass filter with a roll-off of 40 dB per octave at 3.4 kHz.

With signal conditioning completed, the input waveform is written into an analog storage array in the integrated sound circuit beginning at the address stored in 8-bit registers 6U4 and 6U5. Samples are taken by an 8 kHz sample clock and each sample undergoes a level shifting process to produce the voltage required for the nonvolatile writing procedure of the EEPROM array. The sample clock is also used to increment the array decode so that the input samples are stored sequentially in the array. All of these processes are performed automatically by sound integrated circuits 6U6 and 6U10.

Figure 10:
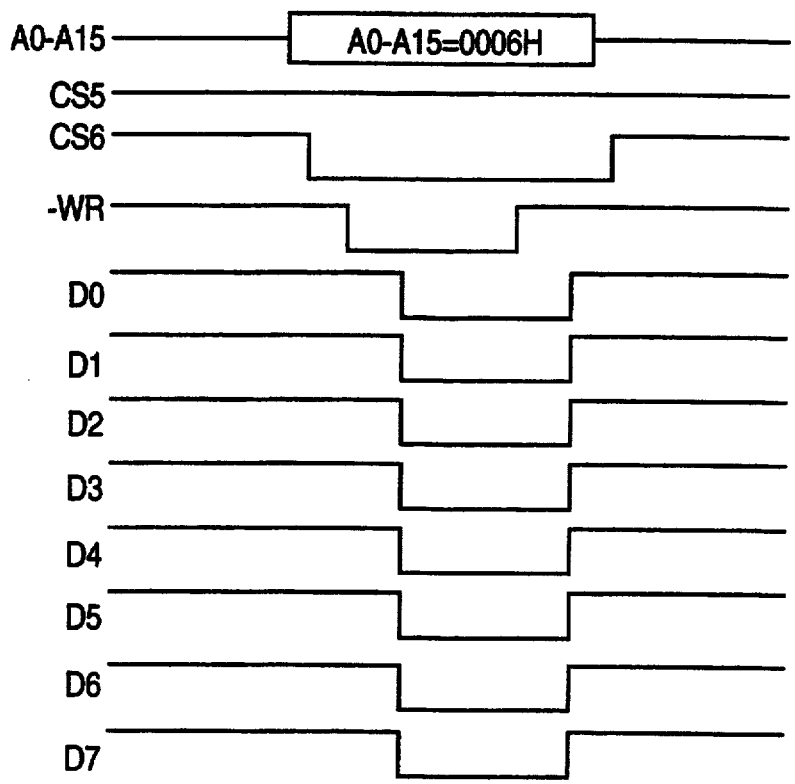
FIG. 10 is a timing diagram illustrating events vs. time for a control sequence in the flowchart in FIGS. 7 and 12.

In time check 708, CPU 414 checks to see if the allocated time for the message has expired. If so CPU 414, in a third load command step 709 loads the disable and power-down command into 8-bit register 6U4. FIG. 10 is a timing diagram of loading 8-bit register 6U4 with the disable and power-down command for sound integrated circuit 6U6. The timing sequence for FIG. 10 is similar to that described above for FIG. 8. Immediately after loading the disable and power-down command CPU 414 beeps enunciator 308 in a second prompt user step 710 to alert the user that the recording process has ended.

Figure 11:
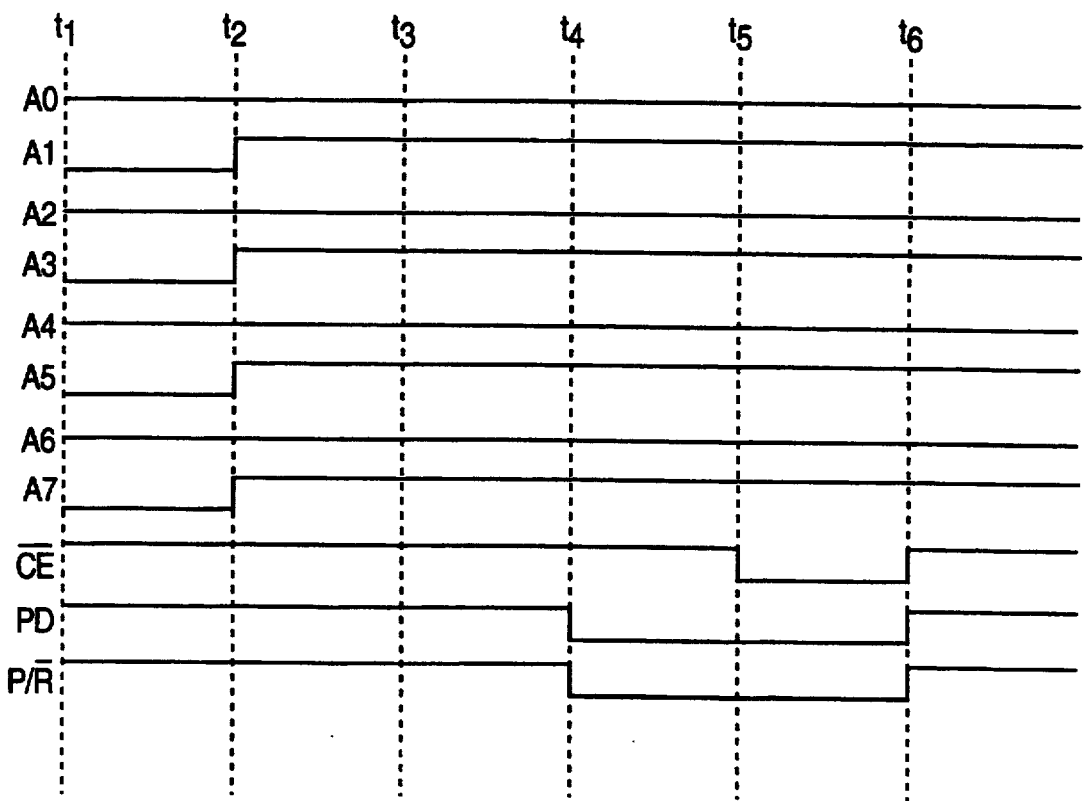
FIG. 11 is a timing diagram illustrating events vs. time for the flowchart in FIG. 7.

FIG. 11 illustrates the timing of the signals output from 8-bit registers 6U4 and 6U5 which drive input pins of sound integrated circuit 6U6. Time t1 represents the initial state after power has been applied. At time t2 the address is loaded. At time t3, the record and power-up commands are loaded. At time t4, the chip enable command is loaded and recording begins. Recording continues until time t5 when the disable and power-down commands are loaded.

Figure 12:
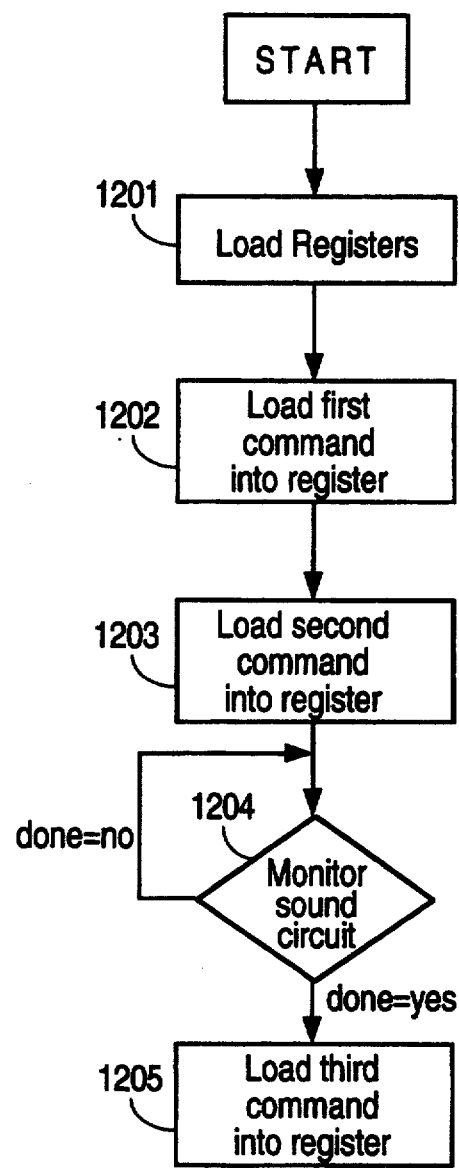
FIG. 12 is a flow chart illustrating the steps in a program that is executed by the CPU in the portable data collection terminal to play a voice prompt.

After the desired messages have been stored in sound integrated circuits 6U6 and 6U10, the messages can be played back in any order. FIG. 12 illustrates the flow of commands issued by CPU 414 to voice prompt circuit 408 to playback a message stored in sound integrated circuits 6U6 and 6U10. To playback a stored message, CPU 414, in load registers step 1201, loads the starting address of the message into registers 6U4 and 6U5 (FIG. 6). FIG. 8, as described above, is a timing diagram for loading 8-bit registers 6U4 and 6U5 with address AAH for sound integrated circuits 6U6 and 6U10.

Figure 13:
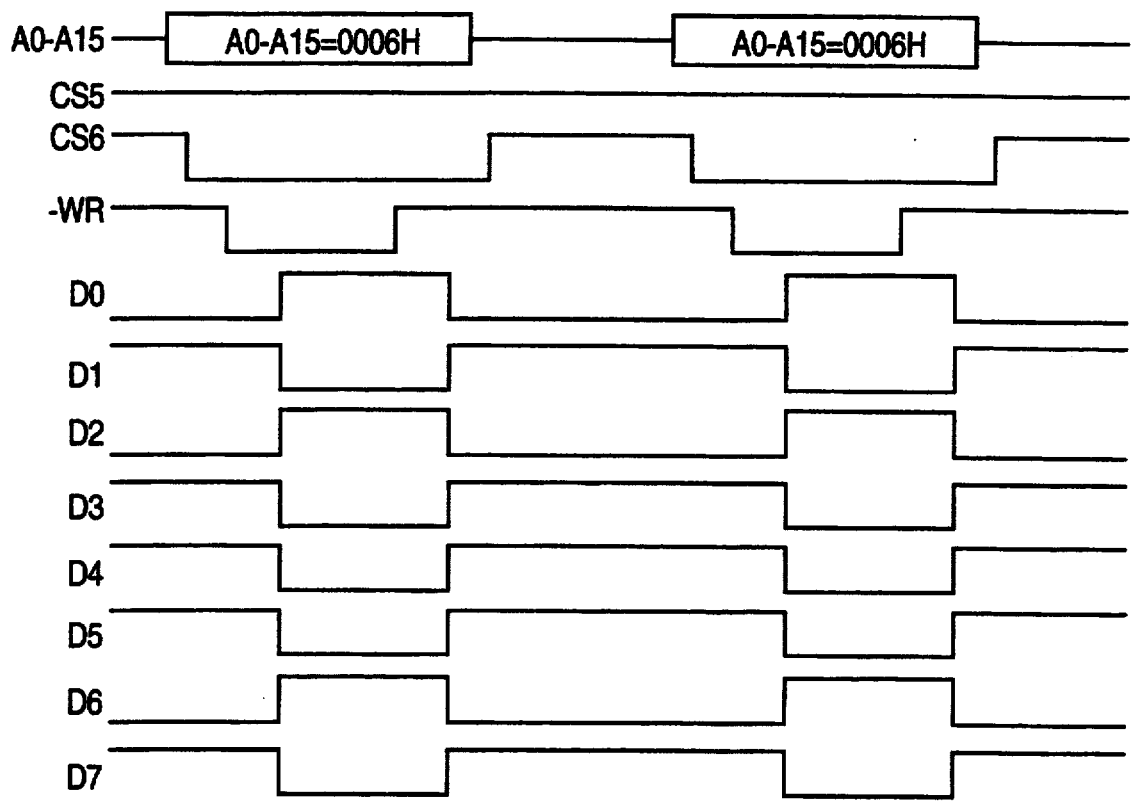
FIG. 13 is a timing diagram illustrating events vs. time for a control sequence in the flowchart in FIG. 12.

Next, in a first load command step 1202, the power-up command and the play command are loaded into register 6U4. After the power-up and play commands are loaded, the integrated circuit is enabled in a second load command step 1203 where the chip enable command is loaded. FIG. 13 is a timing diagram for loading 8-bit register 6U4 with the power-up command followed by the chip enable command in play mode for sound integrated circuit 6U6.

Figure 14:
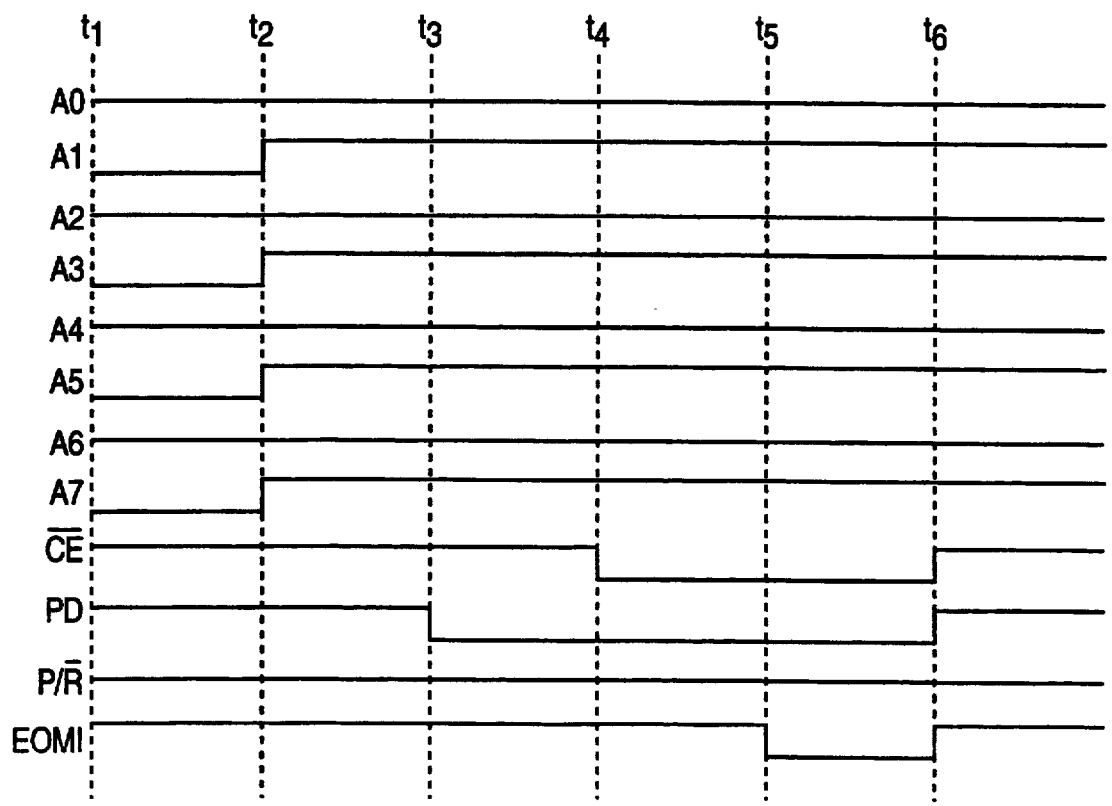
FIG. 14 is a timing diagram illustrating events vs. time for the flowchart in FIG. 12.

The timing sequence in FIG. 13 is similar to that described above for FIG. 8, 9 and 10. FIG. 14 illustrates the timing of the output signals from 8-bit registers 6U4 and 6U5 which drive input pins of sound integrated circuit 6U6. Time t1 represents the initial state after power has been applied. At time t2, the address is loaded. At time t3, the play and power-up commands are loaded. At time t4, the enable command is loaded and playback begins. Playback continues, in monitor sound circuit step 1204, until the selected message has finished playing at time t5. CPU 414 monitors the level of signal EOM1 by repeatedly driving line R1B low and reading the level of data line D0. Sound integrated circuit 6U6 drives signal EOM1 low when playback is complete. At time t6, the disable and power-down commands are loaded in a third load command step 1205, as illustrated in FIG. 12.

During playback in step 1204, the recorded analog voltages are sequentially read from the analog storage array under control of the same sample clock used for recording, thereby reconstructing the sampled waveform. A smoothing filter on the output signal from the analog storage array removes the sampling frequency component and the original waveform is restored. The output signal of the smoothing filter is passed through an analog multiplexer into an output power amplifier and provided at output pins SP+ and SP− of sound integrated circuit 6U6 as differential signals exactly 180 degrees out of phase. The output pin SP+ of sound integrated circuit 6U10 is connected to input pin AUXIN of sound integrated circuit 6U6. This allows slave sound integrated circuit 6U10 to playback messages through the master sound integrated circuit 6U6 since pin AUXIN is connected to the power amplifier when the master sound integrated circuit 6U6 is in the play mode and no message is being played.

Since the output power of the master sound integrated circuit 6U6 at pins SP+ and SP− can only drive 50 milliwatts, an external audio amplifier 6U7 is connected to output pin SP+ of sound integrated circuit 6U6. External audio amplifier 6U7 directly drives a 16 ohm speaker with up to 250 milliwatts of power with low distortion. Preferably audio amplifier 6U7 has the characteristics given in Table 3.

TABLE 3

| Characteristics of Audio Amplifier 6U7 |
| --- |
| Single 5 V supply operation |
| Standby function with current consumption less than 100 μA |
| Direct speaker drive |
| Low distortion |

One amplifier integrated circuit suitable for use in amplifier circuit 507 is sold by Motorola Semiconductor of Phoenix, Ariz. under model number MC34119. Resistors 6R16, 6R20 and 6R21 set the volume level and capacitor 6C5 is used as a high pass filter. Capacitor 6C5, and resistors 6R16 and 6R20 are connected in series between output pin SP+ of sound integrated circuit 6U6 and the input to audio amplifier 6U7. Capacitor 6C8 provides power supply noise rejection for audio amplifier 6U7.

Enunciator 308 is directly connected to amplifier 6U7 and is preferably of the flat type to minimize size and weight. In one embodiment, enunciator 308 has the characteristics given in Table 4.

TABLE 4

| Characteristics of Enunciator 308 |
| --- |
| 40 mm diameter round |
| Samarium cobalt magnet |
| Mylar cone |
| 16 ohm impedance |
| Sound pressure level of 92 dB/W |

TABLE 4-continued

Characteristics of Enunciator 308

Frequency response of 500-8000 Hz

One speaker suitable for use as enunciator 308 in voice prompt circuit 208 is manufactured by Shogyo International Corp. of Great Neck, N.Y. under model number GC0402ML.

The embodiments of this invention, as described above, are illustrative only of the principles of this invention and are not intended to limit the invention to the embodiments described. In view of this disclosure, those skilled in the art will be able to utilize the voice prompt system as well as individual circuits in the voice prompt system in a wide variety of applications.

We claim:

1. A portable data collection terminal comprising:
   a data input means;
   a decoder computer connected to said data input means wherein in response to a signal from said data input means, said decoder computer generates a voice prompt signal;
   a voice prompt circuit connected to said decoder computer so as to receive said voice prompt signal wherein in response to said voice prompt signal, said voice prompt circuit generates an oral voice prompt for an operator of said data collection terminal; and
   said voice prompt circuit further comprising a recording circuit wherein in response to an audio frequency signal, said recording circuit processes said audio frequency signal for storing in said voice prompt circuit.

2. The portable data collection terminal of claim 1 wherein said voice prompt circuit further comprises a memory coupled to said recording circuit wherein said voice prompt stores said processed audio frequency signal from said recording circuit in said memory.

3. The portable data collection terminal according to claim 2 wherein said memory is non-volatile memory.

4. The portable data collection terminal of claim 3 wherein said non-volatile memory is an EEPROM memory.

5. The portable data collection terminal of claim 1 further comprising:
   a built-in microphone coupled to said voice prompt circuit wherein said built-in microphone generates a signal that is a source of said audio frequency signal.

6. The portable data collection terminal of claim 1 further comprising:
   a microphone connection coupled to said voice prompt circuit wherein upon connecting an external microphone to said microphone connection, said microphone is a source of said audio frequency signal.

7. The portable data collection terminal of claim 1 wherein said voice prompt circuit further comprises a speaker wherein said speaker generates said oral voice prompts in response to signals generated by said voice prompt circuit.

8. The portable data collection terminal of claim 1 wherein said voice prompt circuit further comprises:
   a headphone connection.

9. The portable data collection terminal of claim 1 further comprising a built in speaker and a headphone connection.

10. The portable data collection terminal of claim 1 further comprising:
    a display.

11. The portable data collection terminal of claim 1 wherein said data input means is a bar code scanner.

12. The portable data collection terminal of claim 11 wherein said bar code scanner is a hand held bar code scanner.

13. The portable data collection terminal of claim 12 wherein said hand held bar code scanner is a wireless hand held bar code scanner.

14. The portable data collection terminal of claim 12 wherein said hand held bar code scanner transmits data to said portable data collection terminal over a wire connecting said hand held bar code scanner to said portable data collection terminal.

15. The portable data collection terminal of claim 11 wherein said bar code scanner is integral to said portable data collection system.

16. The portable data collection terminal of claim 1 wherein said data input means comprises a keypad.

17. The portable data collection terminal of claim 1 wherein said data input means includes a keypad and a bar code scanner.

18. A portable data collection terminal comprising:
    a processor wherein said processor executes a program that supplies (1) addresses for voice prompts and (2) commands for a voice prompt circuit; and
    a voice prompt circuit further comprising:
      register means connected to said processor to receive said addresses and said commands;
      sound circuit means, connected to said register means, having a non-volatile memory, a record mode and a play mode wherein
        said non-volatile memory contains addressable oral messages; and
        in response to an address loaded in said register means and a play command loaded in said register means, said voice prompt circuit retrieves one oral message from said non-volatile memory means and generates an oral message signal; and
      further wherein in a record mode, said voice prompt circuit processes an audio frequency signal representing an oral message and stores the processed oral message in said non-volatile memory.

19. A portable data collection terminal as in claim 18 wherein said register means comprises a first register and a second register wherein said first and second registers are each addressable by said processor.

20. A portable data collection terminal as in claim 19 wherein said first register is an eight bit register.

21. A portable data collection terminal as in claim 18 further comprising a speaker means coupled to said oral message signal.

22. A portable data collection terminal as in claim 21 wherein said speaker means further comprises:
    an amplifier circuit connected to said oral message signal; and
    a speaker connected to said amplifier circuit.

23. A portable data collection terminal as in claim 21 wherein said speaker means further comprises an earphone connection.

24. A portable data collection terminal as in claim 18 further comprising:
   a built-in microphone coupled to said voice prompt circuit wherein said built-in microphone generates a signal that is a source of said audio frequency signal.

25. A portable data collection terminal as in claim 18 further comprising:
   a microphone connection coupled to said voice prompt circuit wherein upon connecting an external microphone to said microphone connection, said microphone is a source of said audio frequency signal.

26. A portable data collection terminal as in claim 18 further comprising a display.

27. A portable data collection terminal as in claim 18 further comprising a data input means.

28. A portable data collection terminal as in claim 27 wherein said data input means is a bar code scanner.

29. A portable data collection terminal as in claim 28 wherein said bar code scanner is a hand held bar code scanner.

30. A portable data collection terminal as in claim 29 wherein said hand held bar code scanner is a wireless hand held bar code scanner.

31. A portable data collection terminal as in claim 29 wherein said hand held bar code scanner transmits data to said hand held data collection terminal over a wire connecting said hand held bar code scanner to said portable data collection terminal.

* * * * *